Nov. 11, 1930.  R. ESNAULT-PELTERIE  1,781,002
METHOD AND APPARATUS FOR USE IN TESTING MATERIALS
Filed April 4, 1927   2 Sheets-Sheet 1
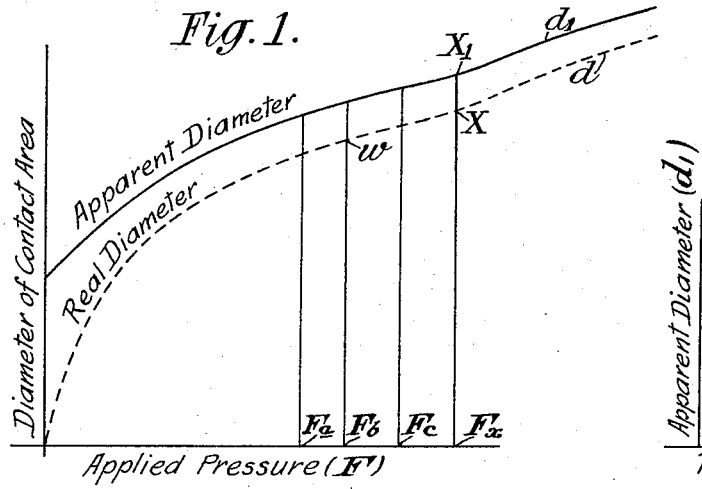
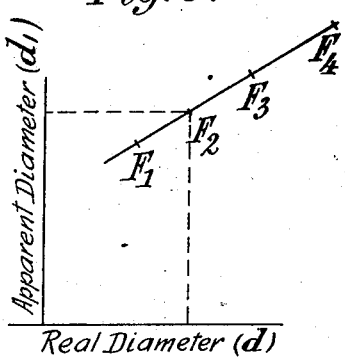
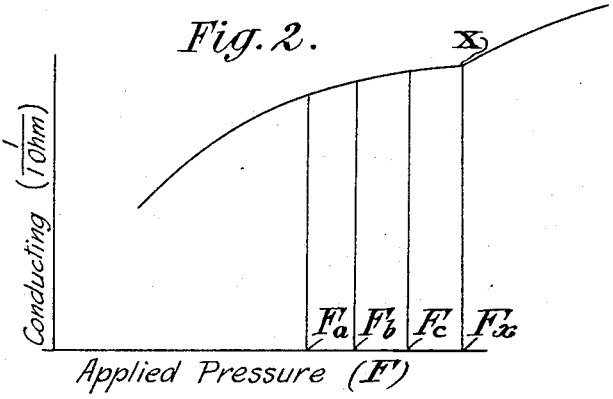
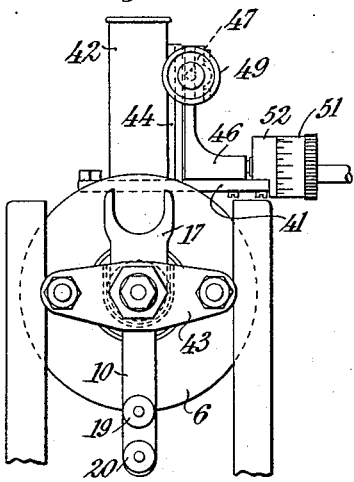
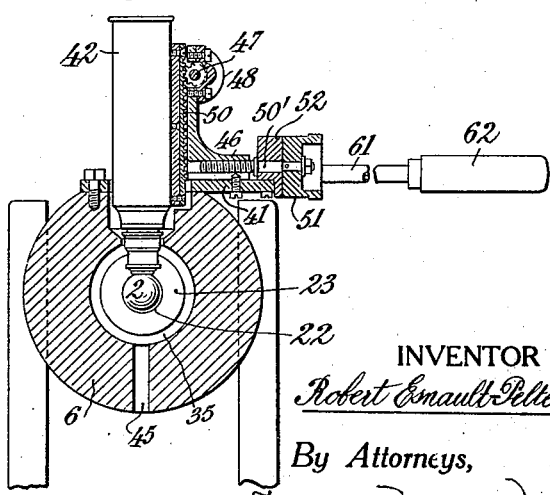
INVENTOR:
Robert Esnault-Pelterie
By Attorneys, Nov. 11, 1930.    R. ESNAULT-PELTERIE    1,781,002
METHOD AND APPARATUS FOR USE IN TESTING MATERIALS
Filed April 4, 1927    2 Sheets-Sheet 2
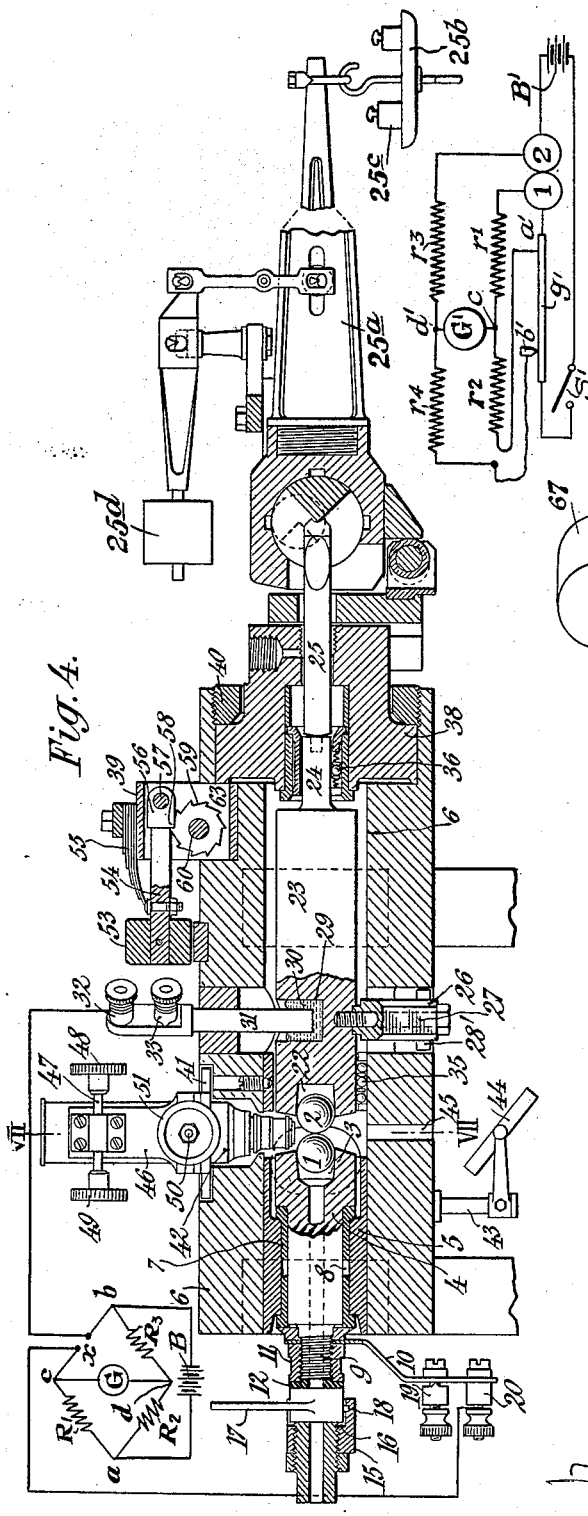
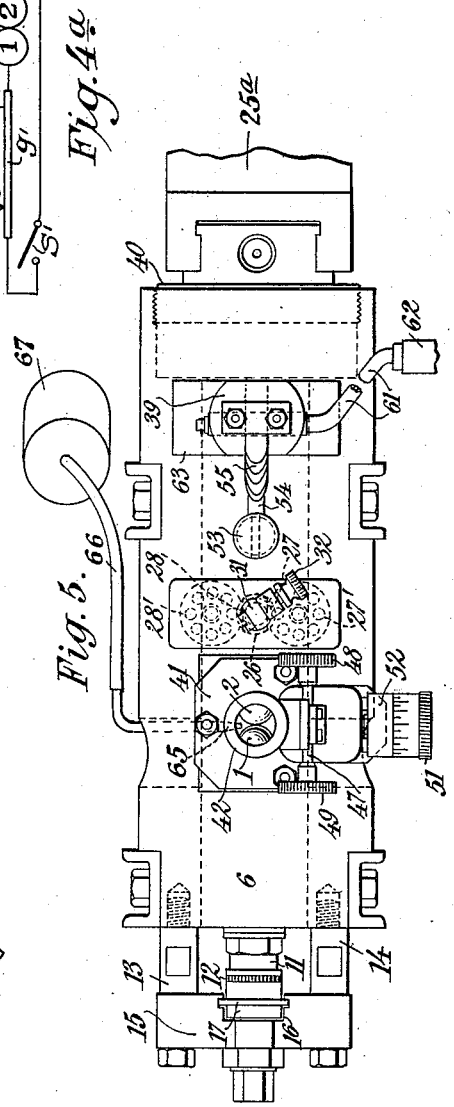
INVENTOR:
Robert Esnault-Pelterie,
By Attorneys,
Fraser Myers + Manley Patented Nov. 11, 1930

1,781,002

UNITED STATES PATENT OFFICE

ROBERT ESNAULT-PELTERIE, OF PARIS, FRANCE

METHOD AND APPARATUS FOR USE IN TESTING MATERIALS

Application filed April 4, 1927, Serial No. 180,874, and in Great Britain February 4, 1927.

This invention relates to a method of and apparatus for use in testing the physical and electrical properties of materials, and is particularly well adapted for testing the hardness of materials. The method and apparatus may be used for testing any two objects the mutually opposed surfaces of which are of such form that changes in the pressure causing their contact, result in changes in their mutual contact area. Two spherical objects or a spherical object and an object having a flat surface may be tested together or any two objects the opposed surfaces of which satisfy the aforesaid condition.

This invention has for its object to provide an improved method and apparatus for testing the physical and electrical properties of materials which is more simple and efficient in use and permits of more accurate determinations, particularly of the hardness of materials, than methods and apparatus heretofore known.

The determinations made according to the present invention may be either absolute or relative, as will be hereinafter set forth. That is to say, the hardness of a material, for example, may be determined only relatively with respect to the hardness of another material or absolutely in terms of force per unit of area required to exceed the elastic limit of the material.

A further object of the invention is to determine the electric contact resistance between specimens of material under various pressures.

Another object of the invention is to provide for the determination of the mutual contact area between abutting specimens or pieces of material through a determination of the resistance or conductivity of said contact area.

The invention further aims to provide a very simple and rapid method for determining the absolute diameter of contact between specimens through a measurement of the apparent diameter of contact in ordinary visible light. The invention further contemplates electrical means for determining with great accuracy the critical point at which a material ceases to follow the law of elasticity, that is, the point at which the elastic limit of the material is reached. The critical point thus determined is then applied to a graph which gives preferably with a high degree of accuracy the diameter of contact for different butting pressures. In this way both a more accurate determination of the critical point and the diameter of contact at such critical point is made.

Further objects of the invention will be apparent from the following description.

For convenience and as an example of the method and apparatus, the invention is hereinafter described in connection with its application to and use with spherical objects in the form of say two balls, as that is the simplest case, but the nature of the invention and its application in general will be readily understood therefrom.

According to the present invention the method for testing hardness consists in determining the deformation as indicated by changes in contact area, these changes being ascertained by observing the variation in the electrical resistances or conductivities across successive contact surfaces of the material under successive definite and different loads or pressures.

In its preferred form the method consists in the application of a succession of different and definite loads or pressures to the materials to be tested so as to produce changes in the mutual area of contact between the said materials, closing an electric circuit across each of the successive contact surfaces, ascertaining the electrical resistances or conductivities across the said successive contact surfaces and determining the hardness from the law of variation of the electrical resistances as a function of the load or pressure applied. The apparatus is so constructed and the parts thereof are so arranged that an indication of hardness can be found from the variation of the electrical resistances or conductivities across the different successive contact surfaces of the material when subjected to definite and different loads or pressures.

In the apparatus as applied to the testing of balls, a ball is wedged in a member having a slightly tapered or conical recess so as to give an annulus of contact between the said ball and the member, the latter being adapted to be axially displaced under a definite load or pressure so as to cause the said ball to butt against an aligned ball, both balls being included in an electric circuit so that on the passage of an electric current across the mutual contact surfaces between the two balls the resistance or conductivity offered by the said contact surfaces can be determined in any known manner. The successive values of the electrical resistances or conductivities of the contact surfaces thus obtained form data in conjunction with the compression forces, from which data the critical point or load producing the rupture can be ascertained. This value of the critical load is then transferred to a graph which gives the diameter of mutual contact surfaces as a function of the load or compression forces and from this the hardness of the balls according to Hertz's formulæ is readily ascertained. The data for plotting contact areas as a function of load may be obtained by any suitable method, such as the method covered by my copending U. S. application, Serial No. 154,700, filed December 14, 1926. By this said method the contact areas produced by various loads are directly recorded on the surface of the balls which are first given a very thin coating of material in which the contact area is readily and permanently recorded when the balls are pressed together. The diameters of the various contact areas resulting from different loads or butting pressures and as recorded in said coating, are then directly measured with a micrometer microscope. The aforesaid aligned ball is mounted so as to give an annular line contact in a stationary member which is rotatable at will, the other ball being mounted with line contact in the axially displaceable member and in axial alignment with the stationary member. Superposed directly above and in alignment with the contact surface is a microscope by means of which the apparent diameter of the contact surfaces in visible light can be ascertained and which may be movable and adjustable vertically in opposite directions and adjustable laterally or cross-wise of the apparatus and if desired also longitudinally of the apparatus. The electric connection between an electrical supply member and the aforesaid axially displaceable member is of such a nature as to permit of axial displacement of the said member with a minimum of friction and without disconnection or removal of the electrical supply member. For this purpose a liquid connection of an electrically conductive nature is provided between the aforesaid axially displaceable member and the electric supply terminal to the axially displaceable member and the two balls are included in the electrical circuit, so that current flows from the supply terminal through the liquid and the axially displaceable member and from thence across the contact surfaces of the balls. Means are preferably secured to the casing of the apparatus whereby to deliver a number of taps or blows in succession thereto, the said means being actuated by hand or power so that the taps or blows can be delivered at any desired time and in any desired number.

In order that the invention may be clearly understood and readily carried into effect reference is made to the accompanying drawings which show diagrammatically and by way of example apparatus in accordance with the present invention.

Figure 1 is a diagram showing a graph of the true diameters of contact $d$ and of the apparent diameters of contact $d_i$ in visible light under different successive loads F. The value of $d$ as a function of F in this particular diagram may be obtained in any suitable manner which forms no part per se of the present invention.

The apparent diameters $d_1$ in visible light are obtained by the use of apparatus in accordance with the present invention.

Figure 2 is a diagram which gives the different corresponding values of the true and apparent diameters $d$ and $d_1$ under successive definite and different loads applied to the balls. The curve so determined is generally very close to a straight line.

Figure 3 is a graph indicating the relationships between electrical conductivity (plotted as ordinates) and loads F, plotted as abscissæ.

Figure 4 is a longitudinal section of the apparatus.

Fig. 4ª is an electrical diagram of the Thompson double bridge for measuring resistance.

Figure 5 is a plan of Figure 4.

Figure 6 is an end view looking in the direction of the arrow A Figure 4.

Figure 7 is a fragmentary cross-section on the line VII—VII of Figure 4 looking in the direction of the arrows.

In order to facilitate a clear understanding of the invention the following explanation is given which considered in conjunction with the graphs of Figures 1 to 3 and the drawings of the device will enable the method and apparatus of the present invention to be clearly understood.

In the specification of my prior application for Letters Patent Serial No. 154,700, filed December 14, 1926, there is described and claimed a method of and apparatus (hereinafter referred to as the primary apparatus) for use in obtaining very nearly an absolute measurement or value of the true diameter $d$ of contact between two bodies under successively definite and different compression forces F, thereby enabling an experimental curve of successive values of $d$ to be plotted and traced as a function of F so that it was thus possible to ascertain up to what value of F the curve can be assimilated to a Hertz cubic parabola. The point of discontinuity X Figure 1 where the aforesaid experimental curve departs from the theoretical cubic parabola indicates the load or compression force after which the tested material ceases to satisfy the law of elasticity, i. e., the elastic limit of the material has been exceeded. Such a curve is shown as a dotted line in Figure 1. It should be clearly understood, however, that it is not absolutely essential that the true diameter $d$ of contact should be obtained by the primary apparatus aforesaid, as such diameters may be obtained by any other known and suitable manner.

The aforesaid primary apparatus and the main method used therein is slow and to some extent tiring on the operator if used for long periods to make a great number of measurements, so that the measures made after some time are not as accurate as those made at the beginning. Furthermore, the method contemplated in the aforesaid primary apparatus involves either the use of photography under short wave length light such as the X-ray, or another means for accurately determining the contact area between specimens involving the use of an extremely thin and delicate surface coating upon the balls or specimens tested. While both of these methods give very accurate results, they are, as compared with the present method, relatively complicated and expensive, and where a great number of determinations are to be made the present method greatly facilitates the work, it being understood, however, that it is necessary to make use of the methods of my prior application hereinbefore referred to, or some other method for accurately determining the diameter of contact area between specimens in conjunction with the present method in order to be able to interpret the readings now very simply obtained by microscopic observation in ordinary light. In ordinary light it is impossible to ascertain the real diameter of contact between specimens, but the apparent diameters of a great number of successive contact areas are very easily obtained. By testing a single specimen according to the said primary method or in any other way to determine the true diameters of contact over suitable pressure ranges, a comparison or correction graph may be plotted by which the relationship between true and apparent diameters is established for any given class of specimens. Thereafter a large number of specimens of this class may be tested according to the present method and the true diameters of contact determined by comparing the apparent diameters, as ascertained according to the present invention, with the graph which shows the relationship between true and apparent diameters. A typical graph of this nature is shown in Fig. 3.

Because of the necessity of realizing a practical apparatus and method for rapidly making a great number of determinations, as would often be required in industrial applications of my invention, I have been led to conceive an improved apparatus and a method incidental thereto which avoids practically all complication and which actually gives a succession of points which are extremely reliable.

The new method avoids the necessity of silvering the materials to be tested which is an important simplification and permits of taking the measurements directly from the two samples being tested.

The diameter of contact which is measured according to the new method and apparatus is not the real diameter but an apparent diameter in visible light which is hereinafter referred to as $d_1$. A curve showing such apparent diameters in visible light is shown as a full line in Figure 1, wherein the abscissæ represent the successive and different applied loads or pressures F to which the different apparent diameters $d_1$ correspond. If the curves $d$ and $d_1$ are plotted on the same scale two critical points (X) and ($X_1$), are necessarily on the same ordinate and the force F producing rupture can be considered in relation to the curve $d_1$ just as well as to the curve of real diameters.

Practice has shown, however, that often the critical point ($X_1$) can not be accurately appreciated directly from the curve of the apparent diameter $d_1$ as a function of F. For this reason according to the present invention a determination is made on a curve presenting the variation of the electrical contact resistances R or conductivities $\frac{1}{R}$ as a function of sucessive and increasing values of F, practice having shown that on the said curve, as shown in Fig. 2, the critical point (X) is far more obvious and may be found with greater precision than on either of the curves $d$ or $d_1$.

Theoretically such conductivity should be proportional to the corresponding real diameter $d$ but in fact it is not, because it is difficult to measure the resistance of conductivity of the contact area alone. The resistance really measured includes necessarily some other electrically resistant elements in the circuit.

It is obvious that such relative measurements are, however, of great value when combined with corresponding determinations of the absolute values of $d$ as a function of F.

On this basis it is necessary to ascertain first of all the variation of the real diameter $d$ as a function of F by any suitable method for a given kind of material, the same operations being afterwards made on the present apparatus so as to determine $d_1$ as a function of F and under the same successive loads or pressures, $F_1$ $F_2$ $F_3$ etc. as those used in determining $d$.

Having done this it is possible to trace for the kind of material under test a diagram or graph or to draw up a table giving true diameters $d$ as a function of apparent diameters $d_1$, as in Figure 3.

This being done the balls under test are turned in their recesses so as to present a new part of their surface to each other and they are submitted to a succession of definite and increasing compression forces $F_a$, $F_b$, $F_c$, etc. which at each time is definitely and accurately known. Under each of these compressive forces two measures are made, one with a microscope and its micrometrical screw to determine $d_1$ and the other by any suitable means to measure the apparent electrical resistance R across the contact surfaces. With these three series of values viz. $d$ previously ascertained, $d_1$ and $\frac{1}{R}$, two curves are plotted; that which shows the values of $\frac{1}{R}$ as a function of F, Figure 2, shows as already stated a well defined critical point (X) which gives the value of F corresponding to the elastic limit.

That value of F applied to the second curve (see the full line in Figure 1) gives the value of $d_1$ corresponding to the elastic limit.

That value of $d_1$ transferred to the diagram of Figure 3 previously established in the manner hereinbefore stated gives the value of the true diameter of contact $d$ for the elastic limit.

These critical or limit-values of F and $d$ are finally transferred into the Hertz formulæ from which the co-efficient of elasticity E and the elastic limit of the tested material can be calculated.

Referring more particularly to Figure 4 of the drawings, 1, 2 are two balls, both of which are of the material to be tested. The ball is mounted in a conical recess 3 in a stationary member 4 so as to give line contact therein. The stationary member 4 is mounted in a sleeve 5 which is rigidly connected with a surrounding casing 6. The stationary member 4 is electrically insulated from the sleeve by insulating material 7 and an air gap 8. The stationary member 4 is reduced at its outer end as at 9 and a terminal plate 10 is mounted on the reduced end 9 of the stationary member 4. The plate 10 is clamped in position by a suitable nut 11 between the reduced end 9 of the stationary member 4 and an insulating washer 12. 13, 14 are two studs which are screwed into the casing 6 and which carry a bridge piece 15 having a recess 16 in which is mounted a handle 17 which on its inner face abuts against the insulating washer 12. In the bridge piece 15 is a recess 18 with which pins or the equivalent on the handle 17 engage, so that the said handle when rotated is prevented from axial displacement, by reason of the engagement of the said pins with the recess 18. The stationary member 4 and the handle 17 form a unitary piece which can be rotated in either of two opposite directions when desired. The plate 10 carries two contact terminals 19 and 20.

The ball 2 is mounted in a conical recess 22 in an axially displaceable member 23 having a reduced outer end 24 with which a rod 25 is adapted to engage. Pressure is applied to the rod 25 in a manner and by means similar to that described in my prior application for Letters Patent Serial No. 154,700, filed December 14, 1926, and consequently it is considered unnecessary to describe such means in detail.

Briefly, this pressure varying means comprises a scale beam $25^a$ carrying at its free end a scale pan $25^b$ upon which suitable weights $25^c$ may be placed in order to secure the required degrees of loading. The scale beam is mounted upon suitable knife edges so as to transmit the force of the weights to the rod 25. This rod acts as above described upon the specimen carrier 23 so as to set up the required pressure between the specimens 1, 2. In the absence of weights $25^c$, the scale beam and pan is preferably perfectly counterbalanced by a counter-balancing beam and weight $25^d$.

The axially displaceable member 23 is mounted centrally in the hollow casing 6 and in alignment with the stationary member 4 so that the two balls 1 and 2 are axially in alignment. 26 is a pin having flattened sides 27, 28 (Figures 4 and 5), which engage between two ball bearing guide rollers 27', 28' (the latter being visible in Figure 4) so as to permit of axial displacement of the member 23 whilst at the same time preventing rotation of the said member 23. 29 is a recess containing liquid mercury 30 into which dips a terminal rod 31 preferably of copper, to the upper end of which two contact terminals 32 and 33 are suitably secured. The axially displaceable member 23 is mounted in the casing 6 by means of a suitable longitudinally-arranged ball bearing 35 and the reduced end 24 of the axially displaceable member 23 is also movable on a longitudinally-arranged ball bearing 36.

The casing 6 is provided with a flat bottomed recess in which is a plate 41 which carries a microscope 42 of any suitable type. The optical axis of the microscope is positioned directly above and in the same plane as the contact surface of the two balls so that their profile can be viewed through the microscope. Below the casing 6 and suitably secured thereto is a bracket 43 on which is pivotally mounted a mirror 44 which is disposed centrally in the line of the optical field of the microscope. 45 is a hole in the casing 6 in line with the optical axis of the mirror. The plate 41 supports a bracket 46 carrying a spindle 47 having two milled knobs 48, 49 by means of which and a suitable gear wheel engaging a rack 50 suitably secured to the microscope casing the said microscope 42 may be adjusted in a vertically upward or vertically downward direction. The bracket 46 also carries a spindle 50' having a knob 51 between which and the plate 41 is an abutment 52 suitably secured to the plate 41. By rotation of the knob 51, the bracket 46, rack 50 together with the microscope 42 may be adjusted crosswise of the casing 6.

In testing with the present apparatus it has been found advantageous to subject the casing 6 and through the said casing the interior parts thereof, to a number of taps or blows by means of a tapper or hammer 53 before each measurement of the electric resistance or conductivity. The tapper or hammer 53 is suitably secured to an arm 54 against which a laminated spring 55 bears the arm 54 being carried by a boss 56 mounted on a pin 57. The lower surface of the boss 56 as at 58 is in such a position as to be engaged in succession by the serrations or teeth of a serrated or ratchet wheel 59 mounted on a spindle 60 which is adapted to be rotated by a crank 61 having a handle 62. The serrated or ratchet wheel 59 may have any number of serrations or teeth. For example the said wheel may have ten teeth or serrations, each tooth or serration as it comes into contact with the lever arm 54 causes the latter to rise and consequently the tapper or hammer 53 against the action of the spring 55. Immediately the serration or tooth passes from under the lower surface of the boss 56 the tapper or hammer 53 drops and strikes the casing 6. The pin 57 and the spindle 60 are supported in a plate 63 suitably secured to the casing 6.

The resistance or conductivity across the contact surfaces may be ascertained by the well known Thompson double bridge method, or by any other method or means which will give sufficiently reliable indications to detect the occurrence of comparatively small changes in such electrical properties.

The connections of a simple resistance measuring bridge are shown (Fig. 4). In a well-known manner resistances $R_1$, $R_2$, $R_3$ of known value are inserted in the bridge, the upper bridge circuit being completed through the terminals 20, 32 of the apparatus, as hereinbefore set forth, so that the contact area of the specimens 1, 2 is included in the bridge circuit. A suitable electrical potential is applied by means of a battery B for example, to the two ends $a$, $b$ of the bridge and a galvanometer G is connected between the midpoints $b$, $c$ of the upper and lower bridge circuits. As is well understood when the values of the known resistances $R_1$, $R_2$, $R_3$ are so chosen as to cause a balance of the bridge resulting in a zero deflection of the galvanometer, the value of the resistance X, which varies with the resistance of the contact area of the specimens under test, may be determined by the formula $$X = \frac{R_1}{R_2} \times R_3.$$

The Thompson double bridge method of measuring resistances is preferred because of its greater accuracy. A diagrammatic showing of the Thompson bridge appears in Figure 4ª. The specimens to be tested are indicated at 1, 2. A calibrated resistance slide $g$, having a fixed contact $a'$ and a movable contact $b'$, is placed in series with the specimens, the circuit being completed through a battery B' and controlling switch S'. Between specimen 1 and the fixed point $a'$, series resistances $r_1$ and $r_2$ are connected, and between specimens 2 and the sliding contact $b'$, series resistances $r_3$ and $r_4$ are connected. Bridging the two series resistance circuits is a galvanometer G' connected at the point $c'$ between $r_1$ and $r_2$ and at the point $d'$ between $r_3$ and $r_4$. If $R_x$ be the unknown resistance between the specimens 1 and 2, and $R_g$ the known resistance between the points $a'$ and $b'$ of the calibrated slide and the resistances are suitably chosen so as to satisfy the equation $$\frac{r_1}{r_2} = \frac{r_3}{r_4}, \text{ then } R_x = R_g.$$

The value of $R_g$ is obtained by a direct scale reading of the position of movable contact $b'$ with respect to slide $g$.

The foregoing methods of determining resistances are old in the art, and are set forth merely as illustrative of two suitable ways in which such determinations may be made.

It will be understood that the inverse of resistance values plotted, for example, in Fig. 2, need not be actually ascertained in terms of ohms. Obviously, any series of determinations which bear an ascertainable relationship to the ohmic resistance will give the data required to detect the point of discontinuity in a curve indicating the relationship of resistance and pressure variations.

It will be obvious that the invention is not limited to the testing of only a single pair of specimens at one time. If one is concerned only with an average determination of the physical properties of several specimens, any number of such specimens could be inserted between the pressure-producing devices and in the electrical circuit at one time. In this case the pressure would be transmitted from one specimen to another, and likewise, the test current and the several contact areas of the specimens would be in series connection.

A jet of hydrogen, nitrogen or non-oxidizing gas may be caused to impinge all around the contact area during the taking of measurements so as to prevent oxidation of the region surrounding the contact area. For this purpose, as shown in Fig. 5, a nozzle 65 connected by a tube 66 to gas reservoir 67 may be inserted through the port 68 in the wall of casing 6. Practically the same result is obtained by applying a thin coating of oil to the specimens prior to testing, it being understood that in every case in order to accurately obtain the resistance characteristics of any material the specimens must have a bright or polished surface free from corrosion and particles of extraneous material. The application of oil to the surface of the specimens does not injure the accuracy of the determinations made according to the present method. From the foregoing it will be apparent that in making tests to determine the hardness of material, the absolute value of the contact resistance between specimens is of no practical importance, it being necessary only to ascertain the critical point at which the resistance curve suddenly changes its form.

The apparatus may, of course, be used for making accurate determination of the resistance between various specimens of material for purposes other than determining the hardness of such specimens.

The method and apparatus according to the present invention are obviously not limited to the specific disclosures hereinbefore made, but may be otherwise variously employed and embodied without departing from the spirit of the invention as set forth in the following claims.

What I claim is:

1. An apparatus for use in testing physical properties of materials, said apparatus including means for varying by known values the pressure between pieces of material, an electric circuit including the contact area between said pieces, and electric measuring means sensitive to variations in the electric resistance of said contact area.

2. An apparatus for use in testing physical properties of materials, said apparatus including means for varying the contact area between pieces of material by the application of a series of known pressures thereto, an electric circuit including the contact area between said pieces, and measuring means sensitive to the flow of current in said circuit whereby variations in the conductive properties of the contact area between said pieces may be determined.

3. An apparatus for use in testing physical properties of materials, said apparatus including means for varying the pressure between pieces of material, mechanical pressure indicating means, and an electric circuit, the conductivity of which is varied by the pressure applied to said pieces.

4. An apparatus for use in testing the physical properties of materials, said apparatus including a source of electric energy, relatively movable specimen holders, at least one of which is energized by said electric source, said energized holder being provided with an opening to receive a spherical specimen of material, the said opening having tapered sides adapted to exert a wedging action on the spherical specimen when said specimen is pressed into the said opening, whereby an improved electrical contact is obtained between said spherical specimen on its holder.

5. The apparatus according to claim 4, further characterized in that the said energized specimen holder is provided with a conical recess of slight taper, within which the spherical specimen is frictionally held, the contact between the specimen and holder forming an annulus of good electrical conductivity.

6. An apparatus for use in testing the physical properties of materials, said apparatus comprising a movable specimen holder, means for applying various pressures to said specimen through said holder, an electric circuit including at least portions of said specimen and holder, and an electrically conductive liquid connection between said movable holder and one side of the current supply whereby the specimen holder is electrified without the use of a solid connection.

7. The apparatus according to claim 6, further characterized in that the said liquid connection comprises a body of mercury.

8. The apparatus according to claim 6, further characterized in that the said specimen holder is recessed to provide a well, mercury in said well, and an electrode projecting into said mercury, the said well being larger than the electrode to permit of their relative movement.

9. An apparatus for use in testing the physical properties of materials, comprising means for pressing with varying degrees of force, pieces of material together, means adapted to indicate changes in the electrical resistance of the mutual contact area between said pieces, and means for jarring said specimens whereby to cause a more intimate electrical contact between them.

10. An apparatus for use in testing the physical properties of materials, comprising means for pressing with varying degrees of force, pieces of material together, means adapted to indicate changes in the electrical resistance of the mutual contact area between said pieces, and means for delivering a succession of taps or blows to the apparatus whereby the accuracy of the electrical determination is increased.

11. The apparatus according to claim 2, further characterized in that a micrometer microscope is provided, said microscope permitting measurement of the apparent diameter of contact between the said pieces of material under various pressures.

12. The apparatus according to claim 2, further characterized in that a micrometer microscope is provided, said microscope permitting measurement of the apparent diameter of contact between the said pieces of material under various pressures, the microscope being provided with a vertical and two horizontal adjustments whereby its optical axis may be brought into the plane of the said contact area, and the microscope focused on the diameter of contact.

13. The apparatus according to claim 1, further characterized in that means are provided for rotating one of the pieces of material about an axis normal to the said contact area whereby to improve the electrical conductivity of the said contact area.

14. The apparatus according to claim 1, further characterized in that a hammer device is provided, including yielding means causing the hammer head to engage the apparatus and a rotatable actuator adapted to periodically move said hammer head away from the apparatus and then release it, whereby said hammer is caused to impart to the apparatus a series of blows or taps.

15. An apparatus for use in testing properties of materials including means for producing variable contact pressures between pieces of material, electrically actuated means for indicating variations in the electrical resistance of the mutual contact area between said pieces, a chamber at least partially enclosing said pieces, and means for supplying to said chamber a non-oxidizing gas whereby to prevent the oxidation of the exposed surface of the said pieces of materials.

16. An apparatus for use in testing the properties of materials, including a normally stationary specimen holder, a movable specimen holder adapted to freely slide toward or away from said stationary holder, a scale beam adapted to transmit various gravitational forces to said movable holder whereby to vary the pressure between two specimens, a micrometer microscope adapted to measure the apparent diameter of the contact areas between the specimens under various loads, and means adapted to indicate changes in the electrical conductivity of the said contact area between specimens.

17. The apparatus according to claim 16, further characterized in that a tapping device is provided to deliver a series of blows to the apparatus between successive pressure increments.

18. The method of determining the hardness of materials, said method comprising a determination of the variation of the mutual contact area between specimens under definite and different successive loads and a determination of the variation of the electrical resistance of the successive contact areas produced by said loads, the said electrical data plotted against load rendering apparent the critical load at which the elastic limit of the material is reached, and this critical load giving on a graph showing the relationship between load and contact area, the contact area at which the elastic limit of the material is reached whereby through the application of Hertz's formula the hardness of the material tested is readily determined.

19. The method of determining the true contact areas under a succession of different loads between specimens of a given class in the form of balls or the like, said method comprising a determination of the apparent diameters of contact by direct measurement thereof with a micrometer microscope using visible light, and determining by known means the true diameter of contact over desired ranges of pressure of one specimen of the said class, and thereafter converting apparent diameters to true diameters by the use of data thus obtained showing the relationship between true and apparent diameters for specimens of said class.

20. The method of determining physical properties of materials, said method employing the measurement of the electrical resistance between pieces of material, the pieces being so shaped that their mutual contact area varies with the pressure forcing them together.

21. The method of determining the variable area of contact between two specimens by measurement of the electrical properties of said contact.

22. The method of determining the hardness of materials, said method including subjecting specimens of material to various pressures and measuring the resistance of the mutual contact between said specimens while subjected to various pressures.

23. The method of determining the critical pressure at which the elastic limit of a material is reached, said method comprising the observation of the change in electrical resistance of a contact, the conductivity of which varies with the load applied to the material under test.

24. The method according to claim 22, further characterized in that before the resistances of the contact areas are measured, the specimens are subjected to a mechanical jarring while subjected to pressure whereby to improve the accuracy of the electrical measurements of the resistance.

25. An apparatus for testing the physical properties of materials, said apparatus including mechanical means for varying by definite values the pressure between pieces of material, said pieces being so formed that their mutual contact area is a function of the pressure, and electrical means adaped to indicate changes in the resistance of the said mutual contact area.

26. The method of determining the elastic properties of a plurality of specimens of material, said method comprising the determination by known means of the true diameter of successive contact areas of one specimen of material with another under a succession of different known pressures, determining under a succession of pressures the apparent diameters of contact between a series of specimens of the same class by direct microscopic measurement thereof in visible light, ascertaining for each specimen the pressure at which its elastic limit is exceeded by observing the point at which the electrical resistance of the mutual contact area between two specimens suddenly changes, and converting the observed apparent diameters to true diameters by the data obtained by the first mentioned step in said method whereby the elastic limit of the several specimens may be calculated in terms of the pressure and the resultant true diameter of contact area that obtains when the electrically-indicated elastic limit is reached.

In witness whereof, I have hereunto signed my name.

ROBERT ESNAULT-PELTERIE.